T. LUMSDON.
Grain Drill.

No. 107,186.  Patented Sept. 6, 1870.

Witnesses:  Inventor:

United States Patent Office.

THOMAS LUMSDON, OF WATERFORD, OHIO.

Letters Patent No. 107,186, dated September 6, 1870.

IMPROVEMENT IN COMBINED ADJUSTABLE CULTIVATORS AND GRAIN-DRILL.

The Schedule referred to in these Letters Patent and making part of the same

*To all whom it may concern:*

Be it known that I, THOMAS LUMSDON, of Waterford, in the county of Washington and in the State of Ohio, have invented certain new and useful Improvements in Combined Adjustable Cultivator, Grain-Drill, and Harrow; and do hereby declare that the following is a full, clear, and exact description thereof, reference being had to the accompanying drawing and to the letters of reference marked thereon making a part of this specification.

The nature of my invention consists in the construction and combination of an "adjustable cultivator, grain-drill, and harrow," as will be hereinafter fully set forth.

In order to enable others skilled in the art to which my invention appertains to make and use the same, I will now proceed to describe its construction and operation, referring to the annexed drawing, in which—

Figure 1:
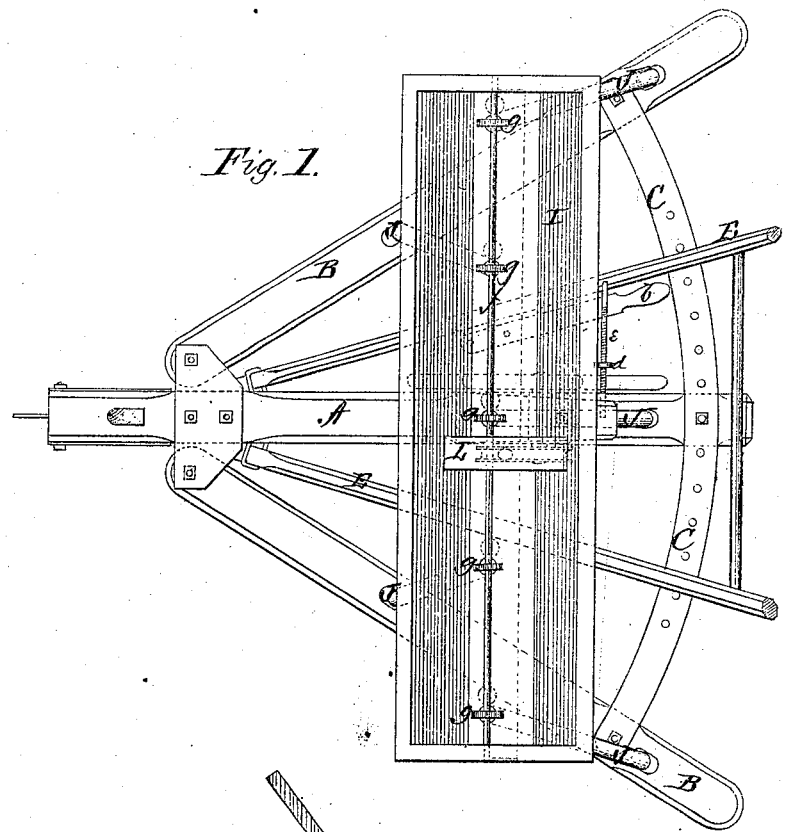

Figure 1 is a plan view, and

Figure 2:
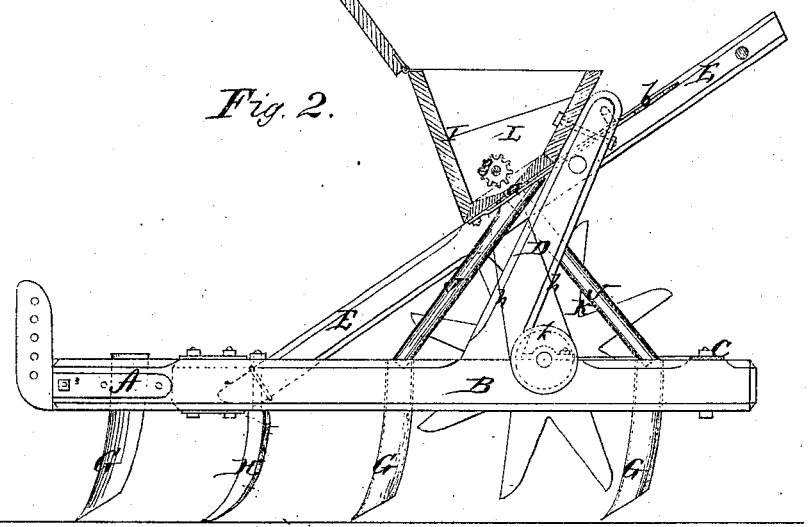

Figure 2, a side elevation, part in section, of my machine.

A represents the center beam, to the front end of which the beam is attached in any suitable manner.

Near the front end of the center beam A are hinged or pivoted the side beams B B, which are adjusted and held at any angle desired from the center beam by means of the curved braces C C. These braces are attached to the side beams B B at or near the rear ends of the same, and lap over each other on the upper side of the center beam A, near its rear end, where they are secured by a bolt and nut. The braces C C are perforated with a number of holes, so that the side beams can be adjusted at any angle desired.

On the center beam A is an inclined standard, D, to which the handles E E are attached by a cross-bar, the front ends of the handles being fastened to the center beam, as shown in fig. 1.

The above constitutes the frame of my machine, always the same for whichever it may be used.

When used as a cultivator there are five shoes, G G, attached two in each side beam and one in the center beam in front.

The harrow is designed for loosening the ground when packed or settled by heavy rains. It can be used either as a one-horse harrow, with five, or as a two-horse, with nine prongs or teeth, one of which teeth, H, is shown in fig. 2.

When the machine is to be used as a grain-drill, the shoes G G are attached as above, and the seed-box I is secured to the handles by hooks and staples or other suitable means.

The bottom of the seed-box I is inclined, as shown in fig. 2, and provided with a suitable number of apertures through which the seed is discharged.

Under the box I is a sliding plate, $a$, provided with holes corresponding with the holes in the bottom of the box.

Attached to the plate $a$ is a lever, $b$, pivoted to the box in such a manner that, when moved to the right, the plate is moved so as to cut off the feed, and when thrown to the left the feed is opened.

The quantity of seed to be discharged is regulated by the thumb-nut $d$, on the rod $e$, against which the lever strikes when moved to the left.

The seed is conducted from the box I to the shoes G G through the tubes or conductors J J, which may may be made of sheet-iron or any other suitable material.

Through the box I passes a shaft, $f$, upon which are placed a series of agitators, $g$ $g$, directly above the seed-openings in the bottom of the box.

On the shaft $f$ is also a pulley, which, by a cord, $h$, is connected with a pulley, $k$, on a shaft placed on the center beam A. This shaft is provided with a spur-wheel, K, which moves along the ground, contributing the necessary rotary motion to the agitators in the seed-box.

The pulley on the shaft $f$ is, within the seed-box, provided with a suitable casing, L, for the purpose of preventing the seed from passing out through the openings in which the cord $h$ moves.

Having thus fully described my invention,

What I claim as new, and desire to secure by Letters Patent, is—

The arrangement of center beam A, hinged side beams B B, perforated plates C C, seed-box I, with shaft $f$, agitators $g$ $g$, and pulley-cord $h$, spur-wheel K, standard D, and tubes J J, all—substantially for the purposes as set forth.

In testimony that I claim the foregoing, I have hereunto set my hand this 3d day of February, 1870.

THOMAS LUMSDON.

Witnesses:
HENRY H. WINSOR,
HENRY STOLLAR.